(12) United States Patent
Natarajan et al.

(10) Patent No.: US 12,323,304 B2
(45) Date of Patent: Jun. 3, 2025

(54) METHOD TO UPDATE 5G VN GROUP TOPOLOGY UPDATE TO AF FOR EFFICIENT NETWORK MANAGEMENT

(71) Applicant: Nokia Solutions and Networks Oy, Espoo (FI)

(72) Inventors: Rajesh Babu Natarajan, Bangalore (IN); Laurent Thiebaut, Massy (FR); Shubhranshu Singh, Munich (DE); Klaus Hoffmann, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 112 days.

(21) Appl. No.: 18/318,121

(22) Filed: May 16, 2023

(65) Prior Publication Data

US 2023/0379222 A1   Nov. 23, 2023

(51) Int. Cl.
*H04L 41/122* (2022.01)
*H04L 41/0816* (2022.01)
*H04L 41/0895* (2022.01)

(52) U.S. Cl.
CPC ........ *H04L 41/122* (2022.05); *H04L 41/0895* (2022.05); *H04L 41/0816* (2013.01)

(58) Field of Classification Search
None
See application file for complete search history.

(56) References Cited

U.S. PATENT DOCUMENTS

| | | | | |
|---|---|---|---|---|
| 10,637,753 | B1* | 4/2020 | Taft | H04W 24/10 |
| 11,026,292 | B2* | 6/2021 | Velev | H04W 76/27 |
| 2021/0152554 | A1* | 5/2021 | Taft | H04L 41/0895 |
| 2022/0039177 | A1* | 2/2022 | Talebi Fard | H04W 48/00 |

FOREIGN PATENT DOCUMENTS

WO   2021/017381 A1   2/2021

OTHER PUBLICATIONS

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.
"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

(Continued)

*Primary Examiner* — Fadi Haj Said
(74) *Attorney, Agent, or Firm* — Nokia Solutions and Networks Oy

(57) ABSTRACT

There is provided a computer program, method and apparatus for an application function that causes the application function to: signal, to a first network function, a first request to be notified of at least one change in first user plane functions associated with a first virtual network, the first virtual network comprising the first user plane functions and a first interface interfacing the first user plane functions with a first data network; receive, from the first network function, a first indication that said at least one change has occurred; and configure connectivity with at least one interface to the first virtual network in dependence on the at least one change indicated in the said first indication.

20 Claims, 13 Drawing Sheets

(56) References Cited

OTHER PUBLICATIONS

"3rd Generation Partnership Project; Technical Specification Group Core Network and Terminals; 5G System; Network Exposure Function Northbound APIs; Stage 3 (Release 17)", 3GPP TS 29.522, V17.5.0, Mar. 2022, pp. 1-385.

"3rd Generation Partnership Project; Technical Specification Group Core Network and Terminals; 5G System; Session Management Event Exposure Service; Stage 3 (Release 17)", 3GPP TS 29.508, V17.6.0, Mar. 2022, pp. 1-58.

"3rd Generation Partnership Project; Technical Specification Group Services and System Aspects; Study on generic group management, exposure and communication enhancements (GMEC) (Release 18)", 3GPP TR 23.700-74, V0.2.0, Apr. 2022, pp. 1-55.

"IEEE 802.1", Wikipedia, Retrieved on Jun. 14, 2023, Webpage available at : https://en.wikipedia.org/wiki/IEEE_802.1.

Extended European Search Report received for corresponding European Patent Application No. 23173624.0, dated Oct. 11, 2023, 13 pages.

"Update to solution 16", SA WG2 Meeting #152e, S2-2206795, Agenda: 9.2, Nokia, Aug. 17-26, 2022, 5 pages.

\* cited by examiner

METHOD TO UPDATE 5G VN GROUP TOPOLOGY UPDATE TO AF FOR EFFICIENT NETWORK MANAGEMENT

RELATED APPLICATION

This application claims priority to India Provisional Application No. 20/221,1028040, filed on May 16, 2022, of which is incorporated herein by reference in its entirety.

FIELD

Various examples described herein generally relate to apparatus, methods, and computer programs, and more particularly (but not exclusively) to apparatus, methods and computer programs for network apparatuses.

BACKGROUND

In general, a communication system can be seen as a facility that enables communication sessions between two or more entities such as user terminals, access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

In 5G, a UE Registration Area (RA) comprises a list of one or more Tracking Areas (TA). A Tracking Area is a logical concept of an area where a UE can move around without updating the network. The network can allocate a list with one or more TAs to the UE.

SUMMARY

According to a first aspect, there is provided an apparatus for an application function, the apparatus comprising means for: signalling, to a first network function, a first request to be notified of at least one change in first user plane functions associated with a first virtual network, the first virtual network comprising the first user plane functions and a first interface interfacing the first user plane functions with a first data network; receiving, from the first network function, a first indication that said at least one change has occurred; and configuring connectivity with at least one interface to the first virtual network in dependence on the at least one change indicated in the said first indication.

The apparatus may comprise means for: signalling, to a second network function, a second request to be notified of at least one change in second user plane functions associated with a second virtual network, the second virtual network comprising the second user plane functions and a second interface interfacing the second user plane functions with a second data network; receiving, from the second network function, a second indication that said at least one change has occurred; and configuring connectivity with at least one interface to the second virtual network in dependence on the at least one change indicated in the said second indication.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a second aspect, there is provided an apparatus for a first network function, the apparatus comprising means for: receiving, from an application function, a first request to be notified of at least one change in first user plane functions associated with a first virtual network, the first virtual network comprising the first user plane functions and a first interface interfacing the first user plane functions with a first data network; determining that at least one of said at least one changes has occurred; and signalling, to the application function, a first indication that said at least one change has occurred.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a third aspect, there is provided an apparatus for an application function, the apparatus comprising: at least one processor; and at least one memory comprising code that, when executed by the at least one processor, causes the apparatus to: signal, to a first network function, a first request to be notified of at least one change in first user plane functions associated with a first virtual network, the first virtual network comprising the first user plane functions and a first interface interfacing the first user plane functions with a first data network; receive, from the first network function, a first indication that said at least one change has occurred; and configure connectivity with at least one interface to the first virtual network in dependence on the at least one change indicated in the said first indication.

The apparatus may be caused to: signal, to a second network function, a second request to be notified of at least one change in second user plane functions associated with a second virtual network, the second virtual network comprising the second user plane functions and a second interface interfacing the second user plane functions with a second data network; receive, from the second network function, a second indication that said at least one change has occurred; and configure connectivity with at least one interface to the second virtual network in dependence on the at least one change indicated in the said second indication.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a fourth aspect, there is provided an apparatus for a first network function, the apparatus comprising: at least one processor; and at least one memory comprising code that, when executed by the at least one processor, causes the apparatus to: receive, from an application function, a first request to be notified of at least one change in first user plane functions associated with a first virtual network, the first virtual network comprising the first user plane functions and a first interface interfacing the first user plane functions with a first data network; determine that at least one of said at least one changes has occurred; and signal, to the application function, a first indication that said at least one change has occurred.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a Multi-protocol Label Switching label and/or a Segment routing Multiprotocol Label Switching label.

The first indication may be signalled to the application function from the first network function via a network exposure function.

According to a fifth aspect, there is provided a method for an apparatus for an application function, the method comprising: signalling, to a first network function, a first request to be notified of at least one change in first user plane functions associated with a first virtual network, the first virtual network comprising the first user plane functions and a first interface interfacing the first user plane functions with a first data network; receiving, from the first network function, a first indication that said at least one change has occurred; and configuring connectivity with at least one interface to the first virtual network in dependence on the at least one change indicated in the said first indication.

The method may comprise: signalling, to a second network function, a second request to be notified of at least one change in second user plane functions associated with a second virtual network, the second virtual network comprising the second user plane functions and a second interface interfacing the second user plane functions with a second data network; receiving, from the second network function, a second indication that said at least one change has occurred; and configuring connectivity with at least one interface to the second virtual network in dependence on the at least one change indicated in the said second indication.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a sixth aspect, there is provided a method for an apparatus for a first network function, the method comprising: receiving, from an application function, a first request to be notified of at least one change in first user plane functions associated with a first virtual network, the first virtual network comprising the first user plane functions and a first interface interfacing the first user plane functions with a first data network; determining that at least one of said at least one changes has occurred; and signalling, to the application function, a first indication that said at least one change has occurred.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a seventh aspect, there is provided an apparatus for an application function, the apparatus comprising: signalling circuitry for signalling, to a first network function, a first request to be notified of at least one change in first user plane functions associated with a first virtual network, the first virtual network comprising the first user plane functions and a first interface interfacing the first user plane functions with a first data network; receiving circuitry for receiving, from the first network function, a first indication that said at least one change has occurred; and configuring circuitry for configuring connectivity with at least one interface to the first virtual network in dependence on the at least one change indicated in the said first indication.

The apparatus may comprise: signalling circuitry for signalling, to a second network function, a second request to be notified of at least one change in second user plane functions associated with a second virtual network, the second virtual network comprising the second user plane functions and a second interface interfacing the second user plane functions with a second data network; receiving circuitry for receiving, from the second network function, a second indication that said at least one change has occurred; and configuring circuitry for configuring connectivity with at least one interface to the second virtual network in dependence on the at least one change indicated in the said second indication.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a Multi-protocol Label Switching label and/or a Segment routing Multiprotocol Label Switching label.

The first indication may be signalled to the application function from the first network function via a network exposure function.

According to an eighth aspect, there is provided an apparatus for a first network function, the apparatus comprising: receiving circuitry for receiving, from an application function, a first request to be notified of at least one change in first user plane functions associated with a first virtual network, the first virtual network comprising the first user plane functions and a first interface interfacing the first user plane functions with a first data network; determining circuitry for determining that at least one of said at least one changes has occurred; and signalling circuitry for signalling, to the application function, a first indication that said at least one change has occurred.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a ninth aspect, there is provided non-transitory computer readable medium comprising program instructions for causing an apparatus for an application function to perform at least the following: signal, to a first network function, a first request to be notified of at least one change in first user plane functions associated with a first virtual network, the first virtual network comprising the first user plane functions and a first interface interfacing the first user plane functions with a first data network; receive, from the first network function, a first indication that said at least one change has occurred; and configure connectivity with at least one interface to the first virtual network in dependence on the at least one change indicated in the said first indication.

The apparatus may be caused to: signal, to a second network function, a second request to be notified of at least one change in second user plane functions associated with a second virtual network, the second virtual network comprising the second user plane functions and a second interface interfacing the second user plane functions with a second data network; receive, from the second network function, a second indication that said at least one change has occurred; and configure connectivity with at least one interface to the second virtual network in dependence on the at least one change indicated in the said second indication.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a multi-protocol Label Switching label and/or a Segment routing Multiprotocol Label Switching label.

The first indication may be signalled to the application function from the first network function via a network exposure function.

According to a tenth aspect, there is provided non-transitory computer readable medium comprising program instructions for causing an apparatus for a first network function to perform at least the following: receive, from an application function, a first request to be notified of at least one change in first user plane functions associated with a first virtual network, the first virtual network comprising the first user plane functions and a first interface interfacing the first user plane functions with a first data network; determine that at least one of said at least one changes has occurred; and signal, to the application function, a first indication that said at least one change has occurred.

The first network function may be at least partially comprised in the first virtual network.

The at least one change may comprise at least one of: an addition of a new interface to the first virtual network; and/or a removal of an interface from the first virtual network.

The first network function may be a network exposure function, and/or a session management function.

The first interface may be a router and/or a bridge between the first user plane functions and the first data network.

The first request may comprise an identifier of a virtual network group that identifies the first virtual network.

The first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, a Multi-protocol Label Switching label and/or a Segment routing Multiprotocol Label Switching label.

The first indication may be signalled to the application function from the first network function via a network exposure function.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Some examples, will now be described, merely by way of illustration only, with reference to the accompanying drawings in which.

DETAILED DESCRIPTION

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

Figure 1A:
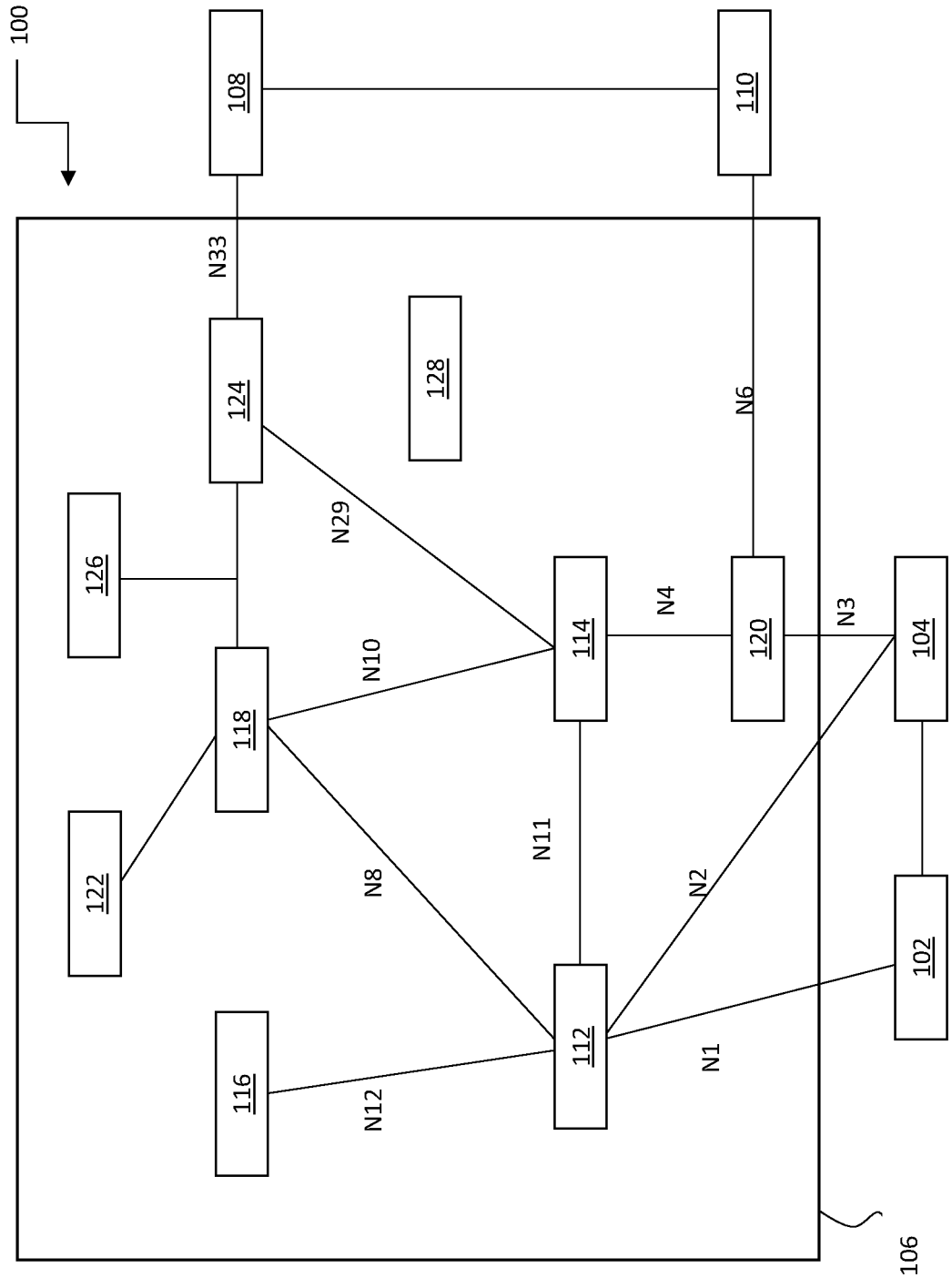
FIGS. 1A and 1B show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

A UPF may be labelled as a Packet Data Unit Session Anchor (PSA) or as an Intermediate UPF (I-UPF). A PSA is a UPF where a user session is anchored, while the I-UPF connects a PSA UPF to a data network. In other words, a PSA UPF is also an UPF but with additional role/functionalities of being an Anchor UPF (connecting directly to the Data Network over an N6 interface).

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
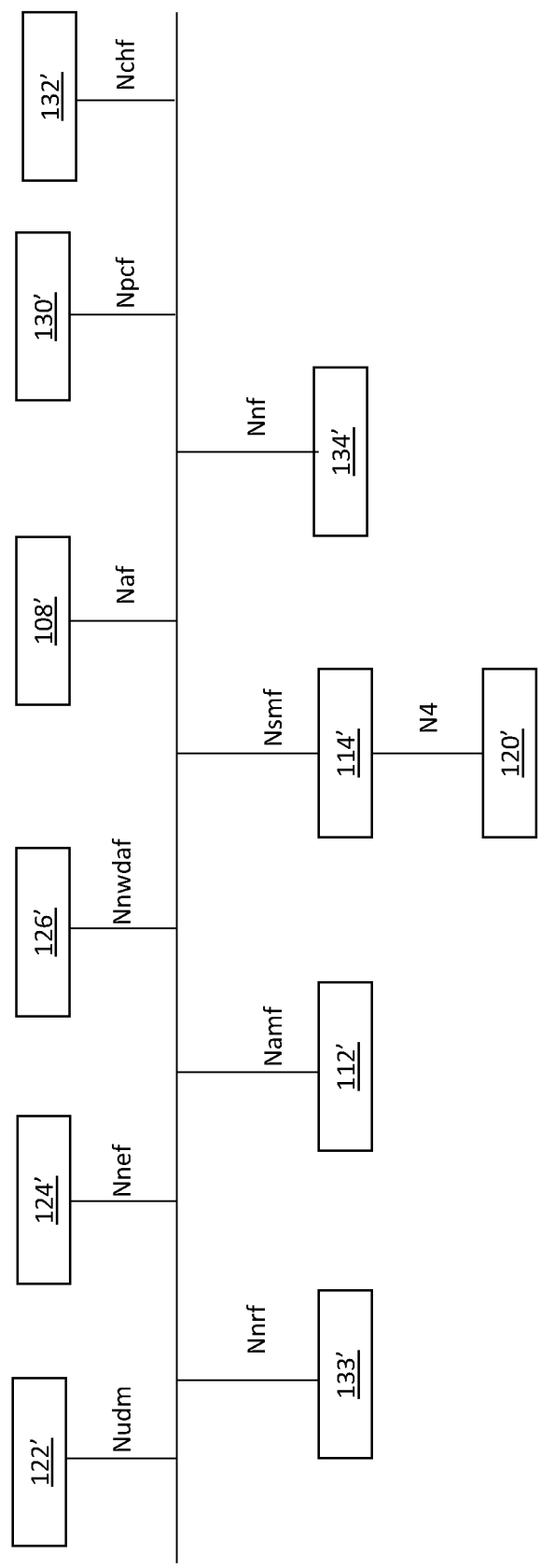

FIG. 1B shows a schematic representations of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface (e.g. a control plane interface,). The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP refers to a group of organizations that develop and release different standardized communication protocols. 3GPP develops and publishes documents pertaining to a system of "Releases" (e.g., Release 15, Release 16, and beyond).

In order to be able to deploy 5G (and, later, 6G) for new and diverse use cases, including industry 4.0 and factory automation, it would be useful to configure the 5G system to work in harmony with the communications technologies used in such industries. For this purpose, 3GPP has been working towards the integration of the 5G system with layer 2 based networks (per, for example, Institute of Electrical and Electronics Engineers (IEEE) 802.1) and with layer 3 (Internet Protocol (IP)) based networks such as defined per Internet Engineering Task Force (IETF) specifications.

As part of this, 3GPP has been considering the integration of 5G with Local-Area Networks (LANs).

5G LAN-type service provides services with similar functionalities to LANs and Virtual Private Networks (VPNs)

but improved with 5G capabilities (such as, for example, high performance, long distance access, mobility and security). In this case the 5G system is to be considered as one element of a more global corporate network (also referred to herein as an "Enterprise network") and 5G groups are therefore working to facilitate the integration of 5G systems with corporate networks.

The 5G LAN-type service enables management of 5G Virtual Network (VN) Group identification, membership and group data. A 5G Virtual Network (VN) group comprises of a set of UEs using private communication for 5G LAN-type services. A VN is currently defined in 3GPP TS 23.501.

The 5G VN Group management may be configured by a network administrator or can be managed dynamically by third party apps (e.g., application functions (AFs)). For example, consider an Enterprise network using 5G for its users exclusively. In this case, only the users within the Enterprise network are allowed to be part of the VN group, and the users get the services of a LAN network of that Enterprise group (e.g. unicast, multicast, broadcast communication) among themselves via 5G network. In other words, only UEs only with the group membership can be part of the 5G VN group and use those services.

In order to support dynamic management of 5G VN Group identification and membership, the network exposure function (NEF) exposes a set of services to manage (e.g. add/delete/modify) the 5G VN group and 5G VN member. This is illustrated later with respect to FIGS. 8 and 9.

Further, an SMF may configure at least one UPF to apply different traffic forwarding methods to route traffic between Packet Data Unit (PDU) Sessions for a "Data Network" as handled by 5GS, where such Data Network may correspond to a corporate network. For example, depending on the destination address, some packet flows may be forwarded locally, while other packet flows may be forwarded via an N19 interface (an N19 interface supports a tunnel between PDU Session Anchor (PSA) UPFs, and is based on a shared User Plane tunnel connecting PSA UPFs of a single 5G VN group) and other packet flows may be forwarded to an N6 (an N6 interface connects a user plane function to a data network). Since an SMF and/or UPF may be configured per service area, in case of 5G VN, the UE belonging to the group might be spread across different service area, requiring an I-UPF to connect the UPFs serving the UEs belonging to the same 5G VN group.

There is a restriction on the Release 16 5G VN group communication session management that states that "A dedicated SMF is responsible for all the PDU Sessions for communication of a certain 5G VN group". Release 18 work aims at supporting reliability of the 5G VN group communication as well as the case where a 5G VN spans over a large area and different UE group member accesses to the 5G VN at different locations.

In particular, when multiple SMFs are involved in serving a 5G VN group, multiple UPFs controlled by these SMFs might be involved to enable 5G VN group communication of the 5G VN group.

These issues of how to support multiple SMFs to serve PDU Sessions of a 5G VN group may be addressed in at least one of a plurality of different ways.

For example, SMF redundancy may be supported for improving reliability of 5G VN group communications.

As another example, architectural enhancements may be made for enabling the support of multiple SMFs to service a 5G VN group. This may comprise support for managing session management when multiple SMFs are involved to serve a 5G VN group where UE group members are connected to multiple UPFs controlled by these SMFs. The UEs accepting 5G LAN services may be grouped together as part of VN group (e.g., as the enterprise/corporate customer example mentioned above). The network may identify the UEs based on 5G VN group and manages the PDU session accordingly.

Further, these architectural enhancements may comprise support for managing communication among UE group members when the UE group members are served by different UPFs and different SMFs, including UE mobility cases. This may consider signalling scalability issues for large VN groups.

Figure 6:
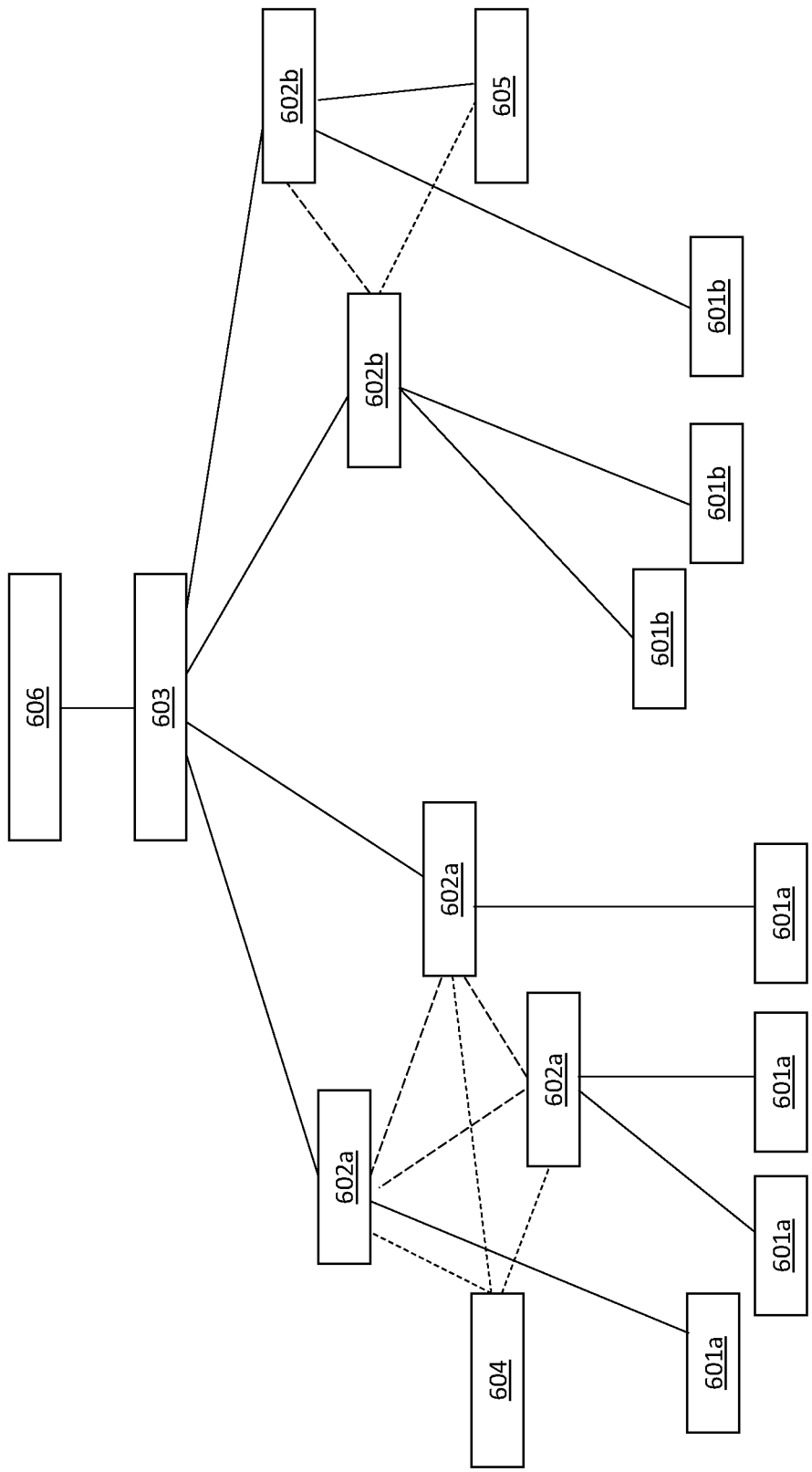
FIGS. 6 and 7 illustrate example network architecture.
Figure 7:
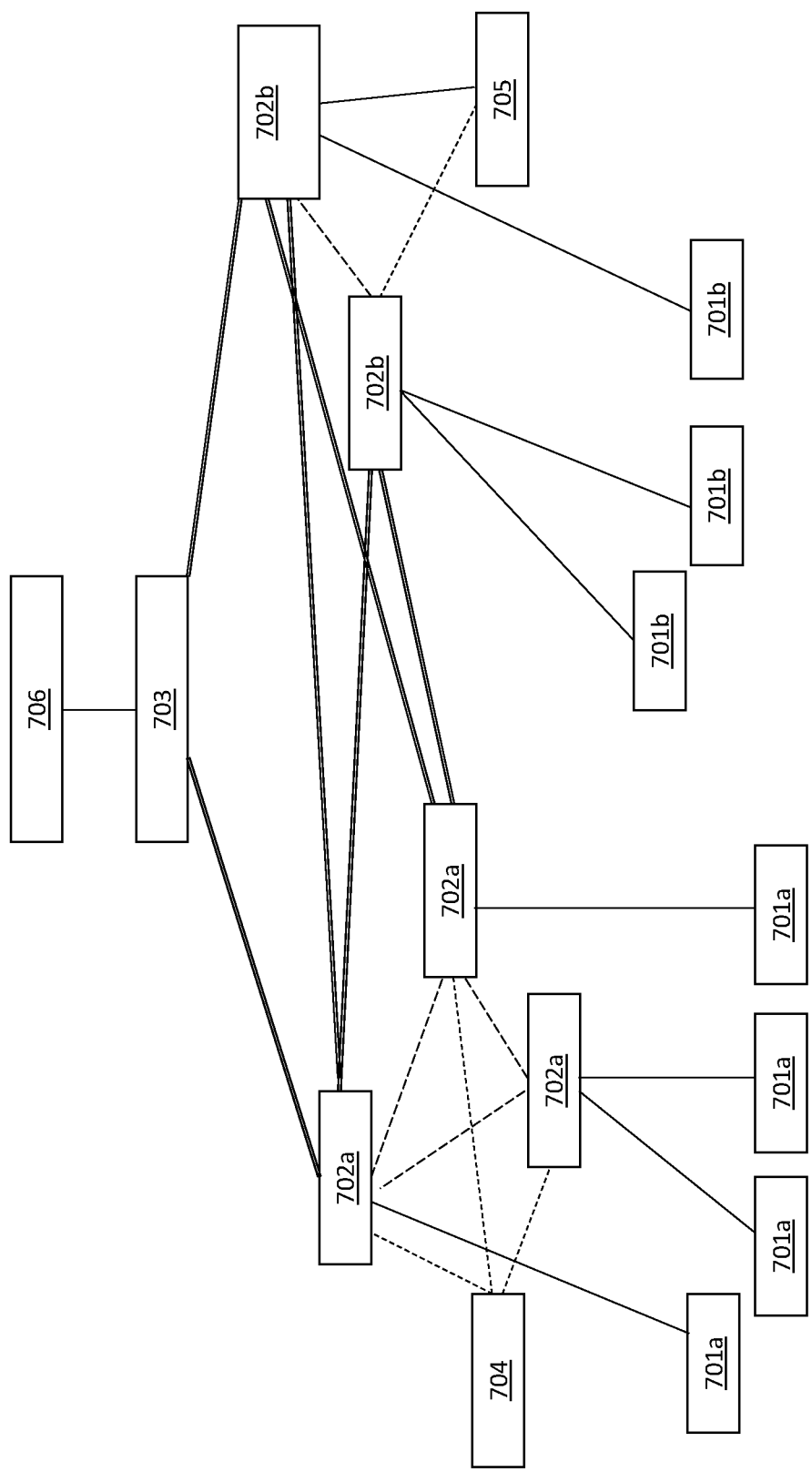

FIGS. 6 and 7 illustrates two example deployment scenarios to be considered.

FIG. 6 illustrates a plurality of UEs 601a, 601b served by a plurality of UPFs 602a, 602b. Some of the UEs are served by the same UPF. Some UEs of the plurality of UEs 601a, 601b are served by the same UPF in the plurality of UPFs 602a, 602b. Other UEs of the plurality of UEs 601a, 601b are served by different UPFs in the plurality of UPFs 602a, 602b.

The plurality of UEs 601a, 601b may comprise a first group of UEs 601a and a second group of UEs 601b. The plurality of UPFs 602a, 602b may comprise a first group of UPFs 602a and a second group of UPFs 602b. The first group of UEs 601a may be served by the first group of UPFs 602a (and not served by the second group of UPFs 602b). The second group of UEs 601b may be served by the second groups of UPFs 602b (and not served by the first group of UPFs 602a).

The first group of UPFs 602a are shown as having N19 tunnels therebetween. At least two UPFs of the first group of UPFs 602a are shown as having respective tunnels (e.g., N6 tunnels) to a router/bridge 603. The first group of UPFs 602a are shown as having respective a Control plane N4 interface towards an SMF 604.

The second group of UPFs 602b are shown as having respective control plane N4 interfaces towards an SMF 605. Two UPFs of the second group of UPFs 602b are shown as having respective tunnels (e.g., N6 tunnels) to the router/bridge 603. The router/bridge 603 may route communications to a host/server 606 on a data network.

In this 5G VN deployment scenario, there is a "native" N6 access provided between UPFs and a data network. The UPFs therefore have access to a "native" data network that may support Ethernet in case of Ethernet PDU sessions and that may support Internet Protocol (IP) payloads in case of IP PDU session types.

FIG. 7 illustrates another deployment scenario.

FIG. 7 illustrates a plurality of UEs 701a, 701b served by a plurality of UPFs 702a, 702b. Some of the UEs are served by the same UPF. Some UEs of the plurality of UEs 701a, 701b are served by the same UPF in the plurality of UPFs 702a, 702b. Other UEs of the plurality of UEs 701a, 701b are served by different UPFs in the plurality of UPFs 702a, 702b.

The plurality of UEs 701a, 701b may comprise a first group of UEs 701a and a second group of UEs 701b. The plurality of UPFs 702a, 702b may comprise a first group of UPFs 702a and a second group of UPFs 702b. The first group of UEs 701a may be served by the first group of UPFs 702a (and not served by the second group of UPFs 702b). The second group of UEs 701b may be served by the second groups of UPFs 702b (and not served by the first group of UPFs 702a).

The first group of UPFs 702*a* are shown as having N19 tunnels therebetween. At least two UPFs of the first group of UPFs 702*a* are shown as having respective tunnels (e.g., VPN tunnels) to a Provider Edge Router 703 via respective Provider Edge Router interfaces. The first group of UPFs 702*a* are shown as having respective N4 interfaces towards an SMF 704.

The second group of UPFs 702*b* are shown as having respective N4 tunnels towards an SMF 705. Two UPFs of the second group of UPFs 702*b* are shown as having respective tunnels (e.g., VPN tunnels) to a Provider Edge Router 703 via respective Provider Edge Router interfaces. The Provider Edge Router 703 may route communications to a host/server 706 on a data network.

In this 5G VN deployment scenario of FIG. 7, there is not a "native" N6 tunnel and/or data network. Instead, the N6 interface may be run over an underlying transport network. The underlying transport network may be, for example, an Internet Protocol/Multiprotocol Label Switching (IP/MPLS) infrastructure. The N6 interface and the data network may thus, in this deployment, be effected as a virtual network running on top of this underlay transport network.

These example deployments do not consider how an N6/Provider Edge Router may obtain information (including updates) on 5G VN topology. This may be useful information to obtain in order to manage the VPN tunnels dynamically by an edge router manager.

Dynamic network management would be useful when very large enterprise networks are to be managed. A very large enterprise network may be considered to comprise networks that could span across multiple domains (e.g., multiple public land mobile networks (PLMNs)). For example, an international company using a 5G network to operate its enterprise network may configure a network such that employees working from different work locations of that international company may be provided with LAN service from the 5G network and different work locations may be connected to different SMF/UPFs and Provider Edge Routers.

In light of the above, the following proposes configuring an application function (AF) that is responsible to subscribe to event exposure from the 5G Core network (5GC) to get dynamic information on the N6 interfaces that the 5GC supports to allow connectivity to the Data Network that this AF can manage. In other words, an AF may ask at least one entity in the 5GC to inform the AF whenever there are changes in the connectivity between the 5GC and the data Network that this AF can manage.

For example, the AF may request to receive information regarding any updates in UPF/5G topology and/or for "User plane management events" as defined for AF Traffic influence in TS 23.501. The AF request may comprise an identifier of the 5G VN (e.g., the DNN Data Network Name) in this request.

The AF request may, for example, be subscribed to the SMF via UDM or via mechanisms defined in clause 4.3.6 of TS 23.502 (such AF subscription requests are stored in a UDR that notifies the PCF that uses the content of the AF request to build PCC rules requesting the SMF to Notify when an interface to the Data network identified by the DNN of the PDU Session is added or removed). The procedure is used by an AF to subscribe to event notifications at NEF, to modify group-based subscriptions to event notification and to explicitly cancel a previous subscription. As described in FIG. 8, The AF subscription may be stored in the UDR for the events indicated by the AF, and then communicated to SMF(s) controlling the PDU Sessions related to the AF subscriptions (i.e., related to the data network whose connectivity the AF is managing). However, it is understood that alternative service mechanisms may be used to achieve a same effect as described herein.

After the subscription is established, whenever the SMF detects an event (such as those listed below), the SMF may notify the AF accordingly. Example events comprise: the addition of a new interface to the Data network identified by a data network name (DNN), the removal of an interface to the Data network identified by the DNN; and/or a change information relating to a UPF or N6 traffic information for at least part one interface to the Data network has changed.

Once the AF has received the Event notification from the SMF, then the AF may update the configuration of the underlaying data network. For example, the AF, acting as a VPN controller (SDN controller) of the Data Network, may establish (or modify or release) suitable connectivity between the N6 interfaces of the 5G Core and one or more bridge/Router(s) within the Data Network as shown in FIG. 6. Alternatively, the AF, acting as a VPN controller (SDN controller) of the Data Network, may establish (or modify or release) suitable tunnels connecting the different N6 interfaces of the 5G Core as shown in FIG. 7. For this purpose, an AF may dynamically configure the data network with information (such as, for example, an IP address, and/or MPLS label, and/or Segment routing (SR) MPLS, and/or a media access control (MAC) address, etc.) while taking into account information on the N6 interface of the PSA UPF received in the notification from the 5GC. This dynamical configuration may e.g. involve Provider Edge Router routers of the data Network.

Figure 8:
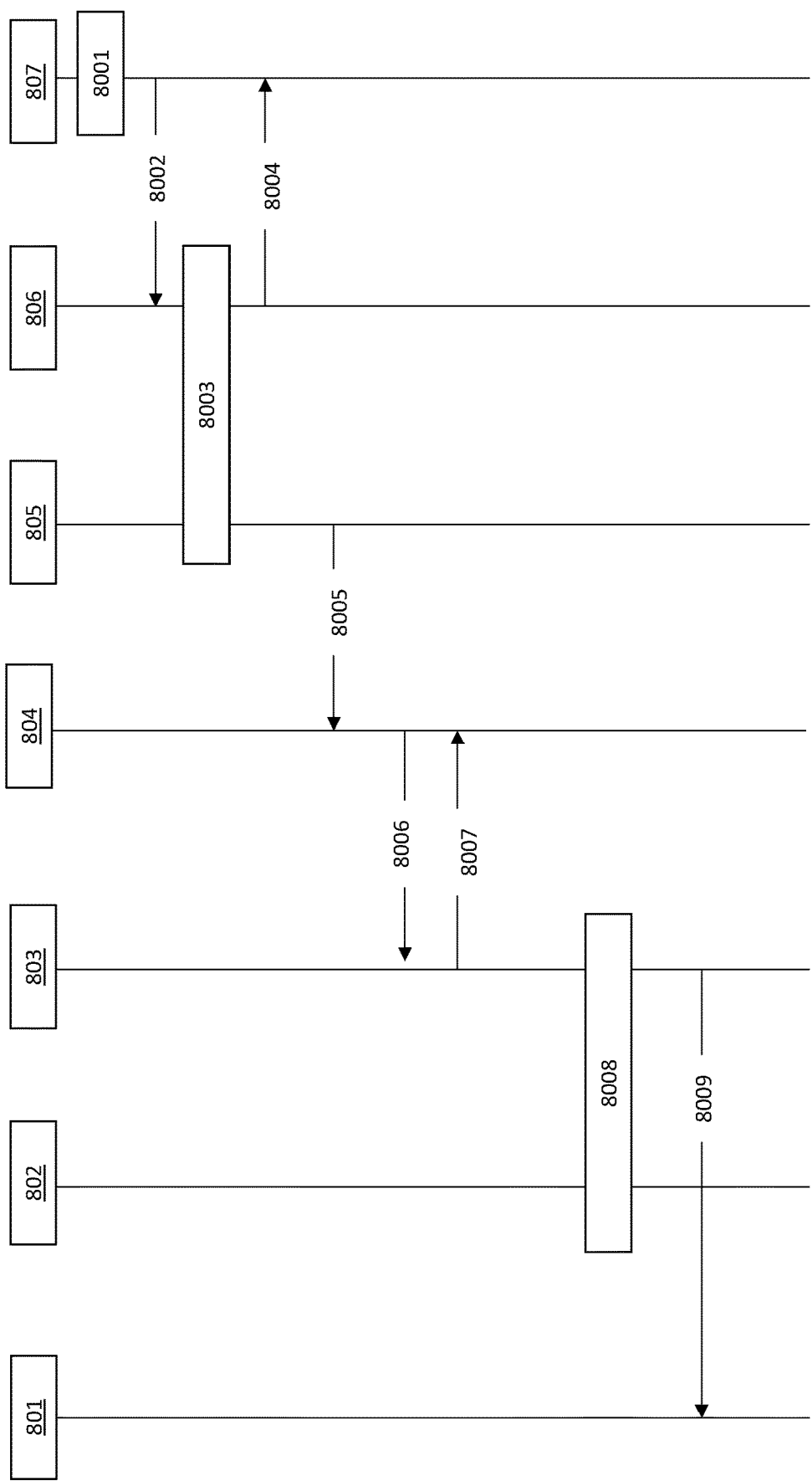
FIGS. 8 and 9 illustrate signalling that may be performed between network apparatus.
Figure 9:
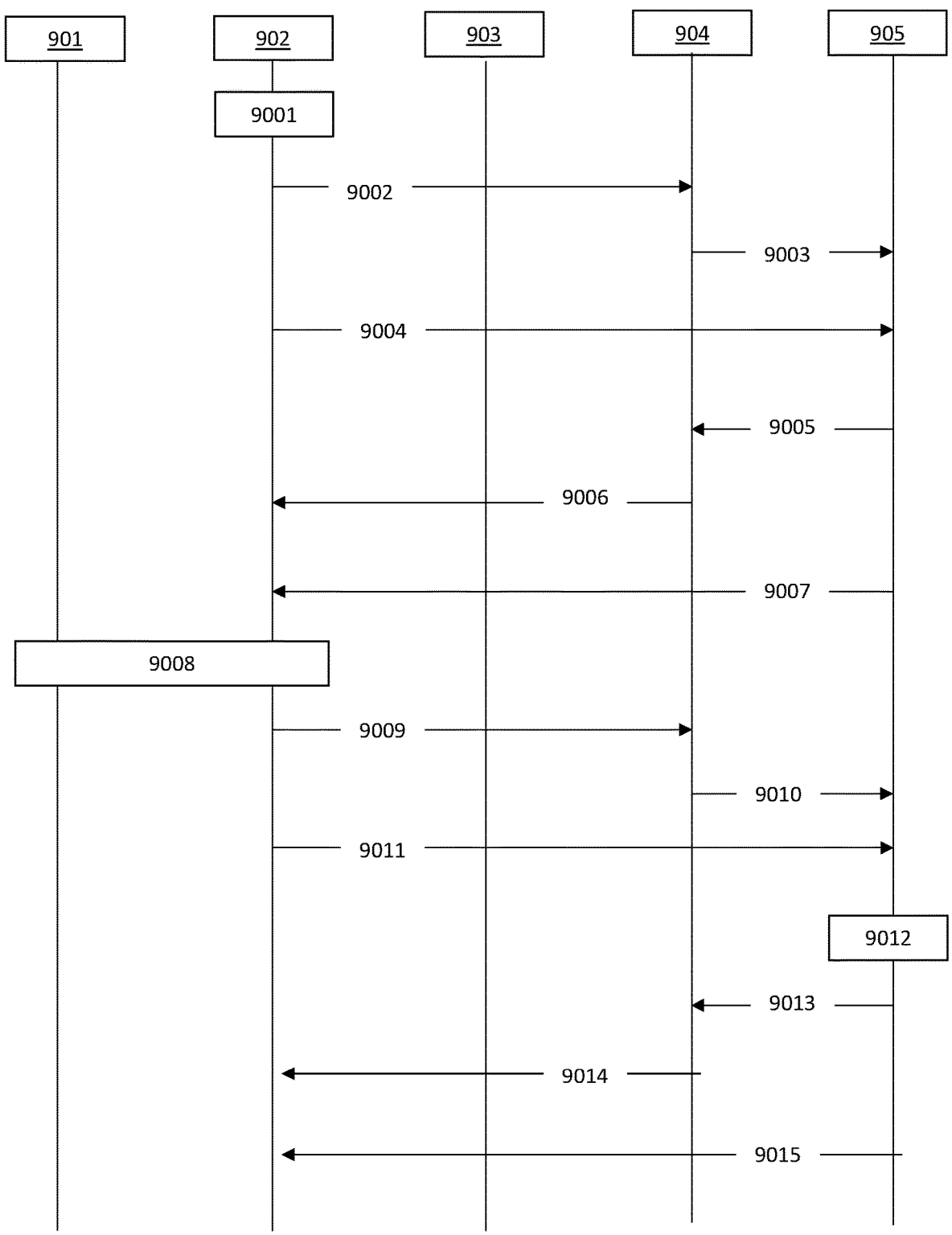
Figure 10:
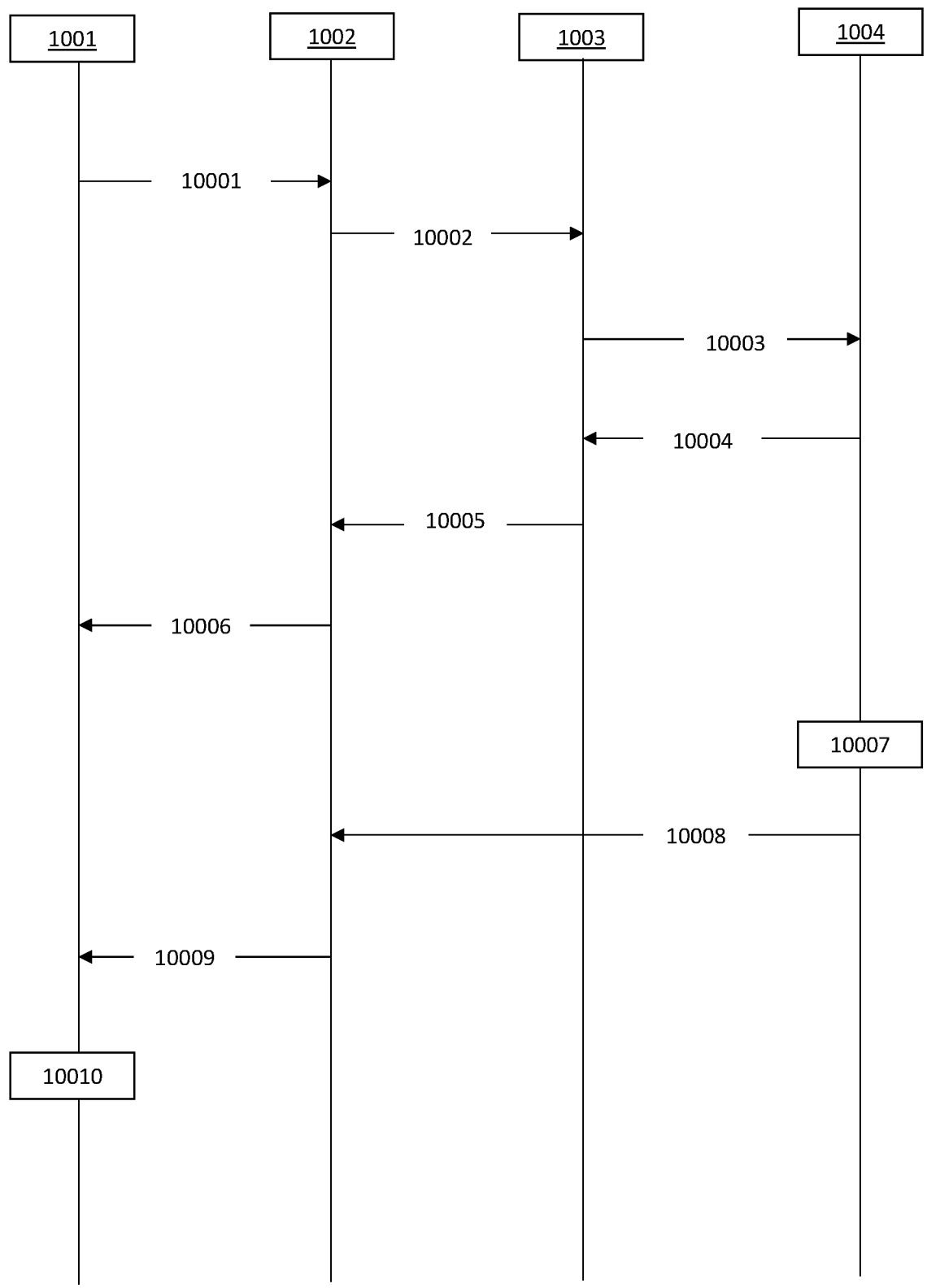
FIG. 10 illustrates example signalling that may be performed by apparatus described herein.
Figure 11:
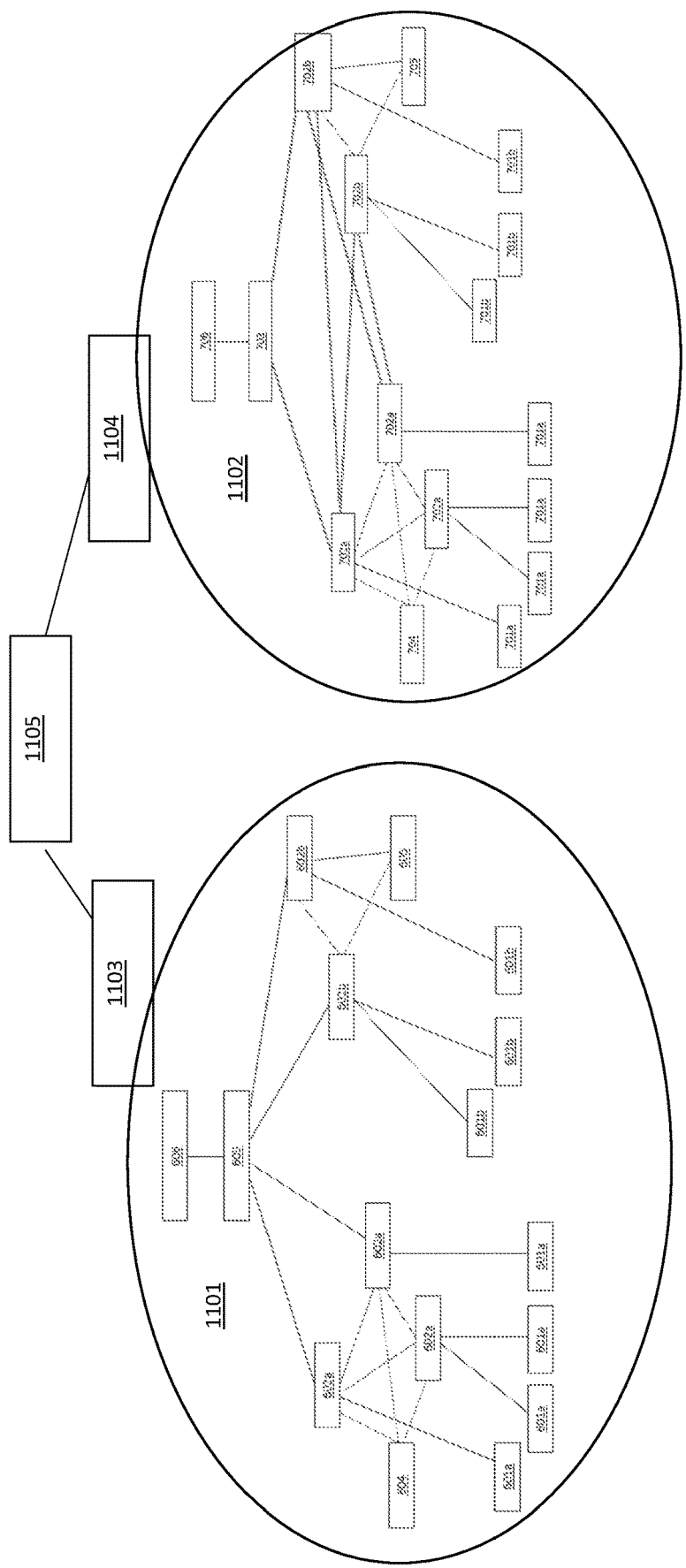
FIG. 11 illustrates example architecture in which the operations of FIG. 10 may be performed.

Before example operations are described in relation to FIGS. 10 and 11, a discussion is provided in respect of FIGS. 8 and 9. FIGS. 8 and 9 relate to operations currently described in 3GPP TS 23.502 that may be performed by an application function, and are provided as a contrast to the presently described operations that may be performed by an application function.

3GPP TS 23.502 describes procedures between an application function and an SMF for maintaining an efficient user plane path for application servers. All of the examples of 3GPP TS 23.502 in respect of these procedures relate to signalling within a single domain.

However, this current 3GPP specification relates to requests made by an application function to influence SMF routing decisions for user plane traffic of PDU sessions, and comprises the application function signalling addresses for user equipment that are to be affected to the SMF.

In particular, an Application Function may send requests to influence SMF routing decisions for User Plane traffic of PDU Sessions. The AF requests may influence UPF (re) selection and allow routing of user traffic to a local access (identified by a DNAI) to a Data Network. The AF may also provide in its request subscriptions to SMF events. The AF may target an individual UE by using a single UE address. The AF may target a group of UEs by providing a group identifier.

FIG. 8 illustrates operations that may be performed in respect of processing application function requests to influence traffic for sessions not identified by an UE address.

FIG. 8 illustrates signalling that may be performed between an access and mobility function 801, a user plane function 802, a session management function 803, a policy control function 804, a unified data repository 805, a network exposure function 806, and an application function 807. FIG. 8 illustrates signalling of Section 4.3.6.2 of 3GPP TS 23.502.

During 8001, the application function 807 forms an AF request to influence traffic. The request comprises an AF Transaction identifier. When the application desires to subscribe to events related with PDU Sessions, the request may comprise an indication of where the corresponding notifications are to be delivered.

During 8002, the application function 807 signals the request of 8001 to the NEF 806. The request may comprise an Nnef_TrafficInfluence_Create and/or Update and/or Delete request.

During 8003, the NEF 806 translates the requests from the AF 807 (possibly transforming the AF identifier into the target DNN of the request) and applies the request of 8002 by storing, and/or updating, and/or removing the requested operation from the UDR 805.

During 8004, the NEF 806 signals the application function 807. This signalling of 8004 may be a response to the signalling of 8002. The signalling of 8004 may be an Nnef_TrafficInfluence_Create/Update/Delete response.

During 8005, the NEF 805 signals the PCF 804. The signalling of 8005 may comprise an Nudr_DM_Notify signal. The PCF 804 may have previously subscribed to modifications of AF requests. The signalling of 8005 may therefore indicate a data change from the UDR.

During 8006, the PCF 804 signals the SMF 803. This signalling of 8006 may comprise an Npcf_SMPolicyControl_UpdateNotify signal. This signalling of 8006 may be performed when the PCF 804 determines that existing PDU Sessions are potentially impacted by the AF request notified in 8005. For each of these affected PDU Sessions, the PCF updates the SMF during 8006 with corresponding new policy information about the PDU Session by invoking Npcf_SMPolicyControl_UpdateNotify service operation. When the AF request comprises a notification reporting request for a user plane path change, the PCF 804 may comprise information in Policy and Charging Control (PCC) rule(s) for reporting the event, including the Notification Target Address pointing to the NEF 806 or AF 807.

During 8007, the SMF 803 responds to the signalling of 8006.

During 8008, the SMF 803 and the UPF 802 perform traffic routing reconfiguration. In particular, when the updated policy information about the PDU Session is received from the PCF, the SMF 803 may take appropriate actions to reconfigure the User plane of the PDU Session.

During 8009, the SMF 803 signals the AMF 801. This signalling of 8009 may comprise an Nsmf_PDUSession_SMContextStatusNotify service operation for triggering SMF (re)selection.

FIG. 9 illustrates signalling that may be performed in respect of notification of user plane management events. In particular, FIG. 9 illustrates signalling that may be performed when the AF of FIG. 8 had subscribed to user plane management event notifications during the signalling of FIG. 8. Therefore, although different numerals are used, the apparatus of FIG. 9 may correspond to equivalent apparatus in FIG. 8.

FIG. 9 illustrates signalling may be performed between a user plane function 901, a session management function 902, a policy control function 903, a network exposure 904, and an application function 905. FIG. 9 illustrates signalling of Section 4.3.6.3 of 3G PP TS 23.502.

During 9001, the SMF 902 determines that a condition for an AF notification has been met. The SMF determines that, in response to this condition being fulfilled, the SMF 902 should send notification to the AF that is subscribed for SMF notifications. For example, an AF may be subscribed to receive an SMF notification in relation to a PDU Session has been established, inducing the usage of a new N6 interface to the Data Network. As another example, an AF may be subscribed to receive an SMF notification when a PDU Session has been released inducing a N6 interface to the Data Network is no more used. In a third (non-mutually exclusive) example, an AF may be subscribed to receive an SMF notification when a PDU Session has been modified due to UE mobility, inducing the usage of a new N6 interface to the Data Network.

Consequently, during 9002, the SMF 902 signals the NEF 904. This signalling of 9002 may comprise an Nsmf_EventExposure_Notify service operation.

During 9003, the NEF 904 signals application function 905. This signalling may comprise an Nnef_TrafficInfluence_Notify service operation. The NEF may have translated information received from the SMF to adapt it to the AF During 9004, the SMF 902 signals the AF 905. This signalling may comprise an Nsmf_EventExposure_Notify service operation.

During 9005, the AF 905 signals the NEF 904. The signalling of 9005 may comprise an Nnef_TrafficInfluence_AppRelocationInfo service operation.

During 9006, the NEF 904 may signal the SMF 902. This signalling of 9005 nay comprise an Nsmf_EventExposure_AppRelocation Info service operation.

During 9007, the AF 905 replies to signalling of 9004 by invoking Nsmf_EventExposure_AppRelocationInfo service operation to the SMF 902 either immediately or after any required application relocation is completed. The signalling of 9007 may comprise N6 traffic routing details.

During 9008, the SMF 902 and UPF 901 interact to cause the change, or removal of a UPF.

During 9009, the SMF 902 signals the NEF 904. This signalling of 9009 may comprise an Nsmf_EventExposure_Notify service operation. This signalling of 9009 may be performed when late notification via an NEF is requested by the AF 905.

During 9010, the NEF 904 signals the AF 905. This signalling of 9010 may comprise an Nnef_TrafficInfluence_Notify service operation. This signalling of 9013 may be performed when late notification via an NEF is requested by the AF 905.

During 9011, the SMF 902 signals the AF 905. This signalling of 9011 may comprise an Nsmf_EventExposure_Notify service operation. The signalling of 9014 may be performed when direct late notification is requested by the AF 905.

During 9012, in response to the signalling of at least 9010 and/or 9011, the AF 905 determines whether an application function instance change is needed. In particular, the AF 905 may determine whether AF 905 can serve the target data network assistance information (DNAI). When it is determined that an AF instance change is needed, the AF 905 determines a target AF for the target DNAI and performs the AF migration.

During 9013, the AF 905 signals the NEF 904. This signalling of 9013 may comprise an Nnef_TrafficInfluence_AppRelocationInfo service operation either immediately or after any required application relocation in the target DNAI is completed. AF includes N6 traffic routing details corresponding to the target DNAI.

During 9014, the NEF 904 signals the SMF 902. This signalling of 9014 may comprise an Nsmf_EventExposure_AppRelocationInfo.

During 9015, the AF 905 signals the SMF 902. This signalling of 9018 may comprise an Nnef_TrafficInfluence_Create/Update service operation. This signalling of 9015 may be performed when targeting an individual UE by a UE address.

Therefore, FIGS. 8 and 9 illustrate operations that may be performed by network functions within a 5GC for changing operations of network functions within a 5GC.

In contrast, the presently described system seeks to obtain information that may be used by, for example, a data network external to a 5GC.

In particular, the following aims to configure an AF to act as a Data Network entity that will dynamically manage connectivity between the N6 interfaces to the Data Network that the 5G Core may add or remove when PDU Sessions related to access to the data network are established, modified, and/or released.

For example, when a PDU session is established for a UE (belonging to the Virtual Network) involving a new UPF supporting access to the Data Network, then a UPF may be added to the plurality of UPFs illustrated with respect to FIGS. 6 and 7. For FIG. 7, a VPN tunnel may further be established when the UPF is added.

Similarly, when the last PDU session (for a UE belonging to the Virtual Network) involving a UPF supporting access to the Data Network is released, then this UPF may no longer be considered as part of the plurality of UPFs of FIGS. 6 and/or 7, and any underlaying transport network may stop maintaining any VPN tunnels in respect of that UPF.

Further, due to other events such as UE mobility, UPF(s) supporting access to the Data Network may be added or removed, and then VPN tunnels involving this/these UPF(s) may be usefully added or removed.

This is illustrated with respect to FIGS. 10 and 11, which show example operations that may be performed by apparatus described herein.

FIG. 10 illustrates signalling that may be performed between an application function 1001, a network exposure function 1002, a unified data management entity 1003, and a session management function 1004. It is understood that the application program interfaces (APIs) mentioned herein (e.g., Nnef_EventExposure_Subscribe) are illustrative only, at that alternative and/or new APIs may be used.

At 10001, the AF 1001 signals the NEF 1002. This signalling of 10001 may be a subscription request. For example, this subscription request may be an Nnef_Event-Exposure_Subscribe request. This subscription request may comprise an indication identifying a 5G VN. For example, this subscription request may comprise a 5G VN group Id. This subscription request may comprise an identifier of at least one event to which the AF 1001 would like to subscribe to at the SMF 1004. For example, this subscription request may comprise a PSA UPF update event indication.

At 10002, the NEF 1002 forwards the subscription request of 10001 to the UDM 1003. This signalling may comprise, for example, an Nudm_EventExposure_Subscribe request. This subscription request may comprise an indication identifying the 5G VN. For example, this subscription request may comprise a 5G VN group Id. This subscription request may comprise an identifier of at least one event to which the AF 1001 would like to subscribe to at the SMF 1004. For example, this subscription request may comprise a PSA UPF update event indication.

At 10003, the UDM 1003 forwards the subscription request of 10002 to the SMF 1004. The SMF 1004 may already be serving UEs belonging to the 5G VN or be identified during new PDU session establishment procedure for a UE belonging to the 5G VN.

This signalling may comprise, for example, an Nsmf_EventExposure_Subscribe request. This subscription request may comprise an indication identifying the 5G VN. For example, this subscription request may comprise a 5G VN group Id. This subscription request may comprise an identifier of at least one event to which the AF 1001 would like to subscribe to at the SMF 1004. For example, this subscription request may comprise a PSA UPF update event indication.

At 10004, the SMF 1004 responds to the subscription request of 10003. This response may comprise, for example, an Nsmf_EventExposure_Subscribe response.

At 10005, the UDM 1003 responds to the subscription request of 10002. This response may comprise, for example, an Nudm_EventExposure_Subscribe response.

At 10006, the NEF 1002 responds to the subscription request of 10001. This response may comprise, for example, an Nnef_Event_Exposure_Subscribe response.

At 10007, the SMF 1004 determines that an event has occurred that the AF 1001 subscribed to receive notifications of during 10001 to 10003. This determination may be made in response to identifying that at least one trigger condition has been met. Examples of the at least one trigger condition comprise at least one VN PDU session being established for that VN group and/or at least one (and possible all) VN PDU sessions being released for that VN group.

At 10008, the SMF signals the NEF 1002. This signalling of 10008 may indicate that the at least one trigger condition has been met. The signaling of 10008 may identify which of the at least one trigger conditions has been met. The signalling of 10008 may identify the 5G VN affected (e.g., via provision of the 5G VN group Id). The signalling of 10008 may provide at least one identifier of the UPF(s) to which the trigger condition relates. For example, the signalling of 10008 may comprise at least one UPF identifier, and/or at least one UPF Internet Protocol address for the affected at least one UPF. The signalling of 10008 may comprise an Nsmf_EventExposure_Notify EventNotification.

At 10009, the NEF 1002 signals the AF 1001. This signalling of 1009 may indicate that the at least one trigger condition has been met. The signaling of 10009 may identify which of the at least one trigger conditions has been met. The signalling of 10009 may identify the 5G VN affected (e.g., via provision of the 5G VN group Id). The signalling of 10009 may provide at least one identifier of the UPF(s) to which the trigger condition relates. For example, the signalling of 10009 may comprise at least one UPF identifier, and/or at least one UPF Internet Protocol address for the affected at least one UPF. The signalling of 10009 may comprise an Nsmf_EventExposure_Notify EventNotification.

At 10010, the AF 1001 may use at least some of the information received in the signalling of 10009 to update a data network and/or router manager with a current network architecture for the 5G VN. The data network and/or router manager may update VPN tunnels dynamically in response to receiving this update.

Therefore, in this example of FIG. 10, and using terminology and APIs currently described in 5G specifications, an AF is responsible for an Enterprise network using a 5GS network to receive LAN service. The AF subscribes with the 5GC for EventExposure by subscribing for the Event: PSA UPF update for 5G VN, by providing a 5G VN ID.

The NF consumer (i.e., the SMF) receives the subscription request via the UDM, and the SMF notifies the AF with a list of PSA UPF (which may comprise identifiers when the subscribing AF is a trusted AF or a range of IP addresses (e.g. IP addresses corresponding to the external/N6 interface of the PSA UPF) or MPLS labels or SR MPLS labels and with an identification of a subscribed event when that event occurs. As mentioned above, the subscribed event may comprise a UPF being added and/or removed from a 5G VN.

Whenever a new PDU session for 5G VN is established, the UDM may, based on existing AF subscription, trigger the event exposure subscription with the new SMF. The SMF may subsequently notify the AF about the new UPF getting added to the 5G VN.

Similarly, when the last of the PDU sessions belonging to the 5G VN group is released by the UPF, the SMF managing the UPF can notify the AF about the UPF being removed from the 5G VN.

Similarly, when the PSA UPF of a PDU sessions belonging to the 5G VN group is relocated by the SMF, the SMF can notify the AF about the UPF being relocated within the 5G VN.

This mechanism may also be applied across multiple domains. This is illustrated with respect to the architecture of FIG. 11.

FIG. 11 illustrates a first network architecture 1101 corresponding to that of FIG. 6 and a second network architecture 1102 corresponding to that of FIG. 7. Each of the first and second network architectures 1101, 1102 comprise respective first and second NEFs 1103, 1104. Both of the respective first and second NEFs 1103, 1104 are connected to a same application function 1105. The application function 1105 may perform the operations in respect of application function 1001. The first network architecture 1101 may correspond to a first 5G VN. The second network architecture 1102 may correspond to a second 5G VN. At least one of the SMFs in each of the first and second network architectures may perform operations corresponding to those described in respect of SMF 1004 for the UPFs connected thereto.

Thus the presently described techniques may be applied to a multiple PLMN scenario, including the case in which there is an extended 5G VN group spanning more than one PLMN. For example, assuming that a first domain/PLMN is serving the enterprise network identified by the first network architecture, and a second domain/PLMN is serving the enterprise network identified by the second network architecture. The AF 1105 managing the enterprise networks may be made aware of a mapping between the two 5G VN IDs from the two PLMNs, and hence the notification update about the 5G VN topology changes may be received dynamically from SMFs of different PLMNs.

The presently described techniques may be applied when there is no N19 tunnel between UPF(s). Further, when N19 tunnels are replaced by proper data Network connectivity (N6 connectivity) established by the data network between the UPF(s). it has also to be noted that the UPF(s) utilized in the presently disclosed techniques may be PDU Session Anchor (PSA) UPFs (i.e. UPF(s) providing an interface (called N6 by 3GPP specifications of 5G Core) to the target Data Network). The connectivity (PDU Sessions) supported between User Equipment and the target Data Network may use other kinds of UPFs, which are not considered herein. Therefore, the examples illustrating the present disclosure may be applied when there are no N19 tunnels between UPFs.

The present disclosure is also different to the above-described systems in that previous efforts related to statistically configuring VPN tunnels and managing it manually, while, under the present disclosure, VPN tunnels are dynamically established/removed based on the VN group topology updates from 5GS.

Figure 12:
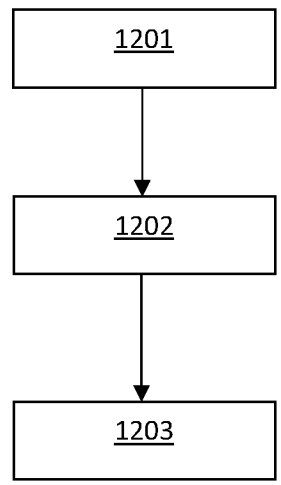
FIGS. 12 and 13 illustrate example operations that may be performed by apparatus described herein.
Figure 13:
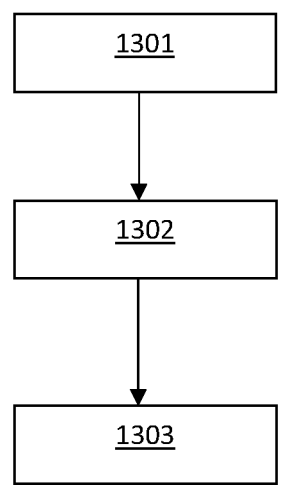

FIGS. 12 and 13 illustrate aspects of the operations that may be performed by the example apparatus discussed above. It is therefore understood that they may comprise features of the above examples in some implementations.

FIG. 12 illustrates operations that may be performed by an apparatus for an application function.

At 1201, the apparatus signals, to a first network function, a first request to be notified of at least one change in first user plane functions associated with a first virtual network, the first virtual network comprising the first user plane functions and a first interface interfacing the first user plane functions with a first data network. The first virtual network may be labelled as simply a network. The virtual network may be labelled as a proprietary network. The virtual network may be labelled as a network comprising both a public network and a private network, where the public network is usable by users of the private network to access the private network. The private network may be a LAN. The public network may be a 3GPP network, such as a 5G network.

At 1202, the apparatus receives, from the first network function, a first indication that said at least one change has occurred.

At 1203, the apparatus configures connectivity with at least one interface to the first virtual network in dependence on the at least one change indicated in the said first indication. In other words, the apparatus may determine that at least one connectivity in the first virtual network may be reconfigured in dependence on a change that has occurred within a core network, and cause that reconfiguration to be performed.

The apparatus may perform these operations in respect of at least two virtual networks simultaneously. Therefore, the apparatus may: signal, to a second network function, a second request to be notified of at least one change in second user plane functions associated with a second virtual network, the second virtual network comprising the second user plane functions and a second interface interfacing the second user plane functions with a second data network; receive, from the second network function, a second indication that said at least one change has occurred; and configure connectivity with at least one interface to the second virtual network in dependence on the at least one change indicated in the said second indication.

FIG. 13 illustrates operations that may be performed by an apparatus for a first network function. The network function may be, for example, a session management function and/or a network exposure function. The network function may be the network function discussed above in relation to FIG. 12.

At 1301, the apparatus receives, from an application function (e.g., the application function of FIG. 12), a first request to be notified of at least one change in first user plane functions associated with a first virtual network, the first virtual network comprising the first user plane functions and a first interface interfacing the first user plane functions with a first data network.

During 1302, the apparatus determines that at least one of said at least one changes has occurred. This may be determined by detecting that at least one event has occurred (such as, for example, an addition and/or deletion of a user plane function associated with the first virtual network).

During 1303, the apparatus may signal, to the application function, a first indication that said at least one change has occurred.

In both of FIGS. 12 and 13, the first network function may be at least partially comprised in the first virtual network.

In both of FIGS. 12 and 13, the change may be at least one of an addition of a new interface to the first virtual network; and/or a removal of an interface from the first virtual network In both of FIGS. 12 and 13, wherein the first network function may be a network exposure function, and/or a session management function.

In both of FIGS. 12 and 13, the first interface may be a router and/or a bridge between the first user plane functions and the first data network.

In both of FIGS. 12 and 13, the first request may comprise an identifier of a virtual network group that identifies the first virtual network.

In both of FIGS. 12 and 13, the first indication may comprise at least one of: an identifier of the first virtual network; an identifier and/or addressing information identifying at least one interface to the first virtual network; and/or an indication of whether said identified at least one interface to the first virtual network has been removed and/or added to the first virtual network.

Said identifier and/or addressing information identifying at least one interface to the first virtual network may correspond to an identifier and/or addressing information identifying at least one user plane function.

The identifier may comprise at least one of: an Internet Protocol address, a media access control address, an Multiprotocol Label Switching label and/or a Segment routing Multiprotocol Label Switching label.

The first indication may be signalled to the application function from the first network function via a network exposure function.

Figure 2:
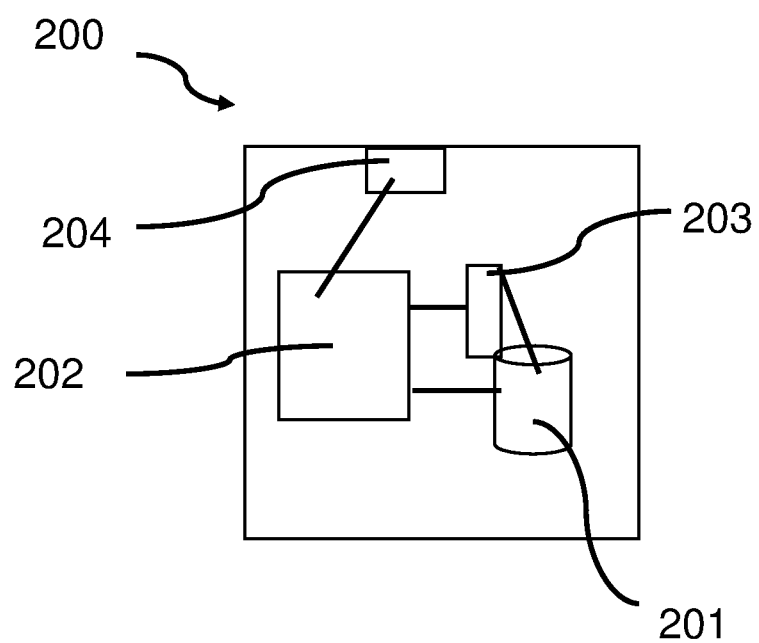
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
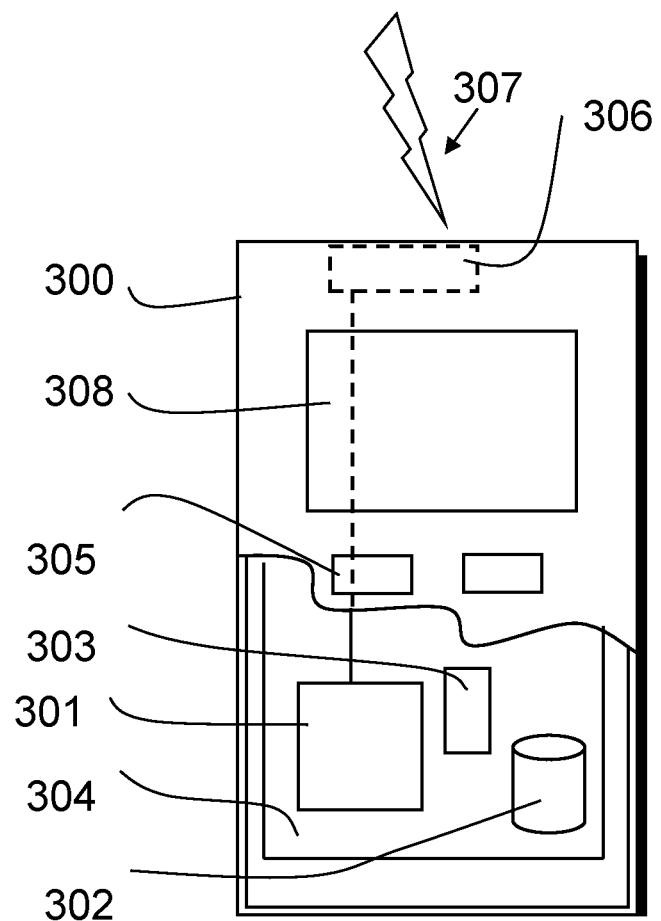
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
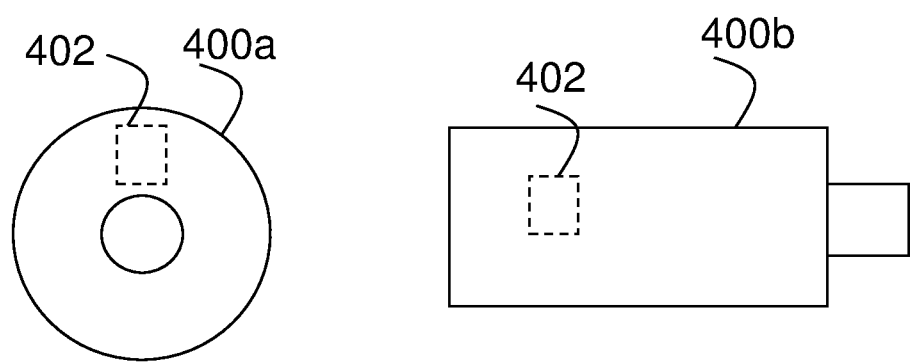
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 13, and/or FIG. 12, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in and/or FIG. 12, and/or FIG. 13, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
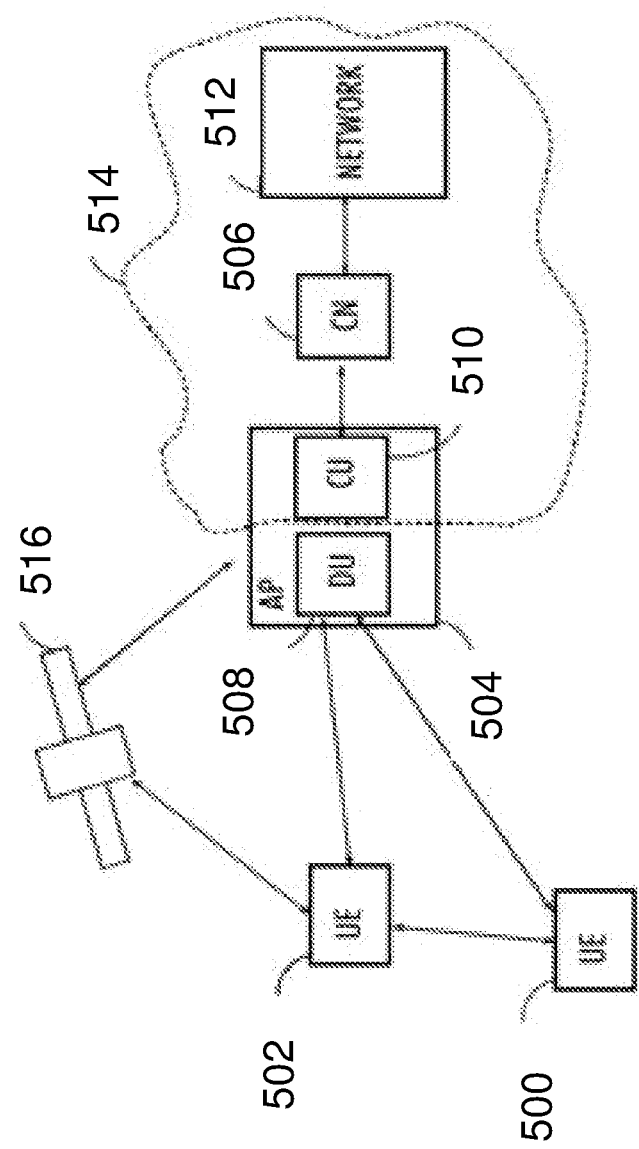
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (I) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud- RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (I) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node.

The invention claimed is:

1. An apparatus comprising
at least one processor; and
at least one memory storing instructions that, when executed by the at least one processor, cause the apparatus to at least perform:
signalling, to a first network function, a first request to be notified of at least one change in first user plane functions associated with a first 5G virtual network comprising a public network and a private network, the public network for use by user equipment of the private network to access the private network, the first 5G virtual network comprising the first user plane functions and at least one first interface interfacing the first user plane functions with the private network;
receiving, from the first network function, a first indication that the at least one change in the first user plane functions has occurred; and
sending, to a router manager of the private network, an update including information concerning a current architecture of the 5G virtual network for causing the router manager of the private network to update at least one virtual private network tunnel of the at least one first interface from the private network to the public network.

2. The apparatus as claimed in claim 1, wherein the instructions, when executed by the at least one processor, further cause the apparatus to at least perform apparatus:
signalling, to a second network function, a second request to be notified of at least one change in second user plane functions associated with a second 5G virtual network comprising another public network and another private network, the another public network for use by user equipment of the another private network to access the another private network, the second 5G virtual network comprising the second user plane functions and at least one second interface interfacing the second user plane functions with a second data network;
receiving, from the second network function, a second indication that the at least one change in the second user plane functions has occurred; and
sending, to a router manager of the another private network, an update including information concerning a current architecture of the second 5G virtual network for causing the router manager of the another private network to update at least one virtual private network tunnel of the at least one second interface from the another private network to the another public network.

3. The apparatus as claimed in claim 1, wherein the first network function is comprised in the first 5G virtual network.

4. The apparatus as claimed in claim 1, wherein the at least one change comprises at least one of the following:
an addition of a new interface to the first 5G virtual network; or
a removal of a first interface of the at least one first interface from the first 5G virtual network.

5. The apparatus as claimed in claim 1, wherein the first network function comprises at least one of the following:
a network exposure function; or
a session management function.

6. The apparatus as claimed in claim 1, wherein the at least one first interface comprises at least one of the following:
a router between the first user plane functions and the private network; or
a bridge between the first user plane functions and the first data private network.

7. The apparatus as claimed in claim 1, wherein the first request comprises an identifier of a virtual network group that identifies the first 5G virtual network.

8. The apparatus as claimed in claim 1, wherein the first indication comprises at least one of the following:
a first identifier of the first 5G virtual network;
at least one of the following: a second identifier or addressing information identifying at least one interface to the first 5G virtual network; or
an indication of whether the at least one interface to the first 5G virtual network identified by the at least one of the second identifier or the addressing information has been at least one of the following: removed or added to the first virtual network.

9. The apparatus as claimed in claim 8, wherein the at least one of the second identifier or the addressing information identifying the at least one interface to the first 5G virtual network corresponds to at least one of the following: an identifier or addressing information identifying at least one user plane function.

10. The apparatus as claimed in claim 8, wherein the second identifier comprises at least one of: an Internet Protocol address, a media access control address, a Multi-protocol Label Switching label, or a Segment routing Multiprotocol Label Switching label.

11. The apparatus as claimed in claim 1, wherein the first indication is received from the first network function via a network exposure function.

12. A method for an apparatus for an application function, the method comprising:
- signalling, to a first network function, a first request to be notified of at least one change in first user plane functions associated with a first 5G virtual network comprising a public network and a private network, the public network for use by user equipment of the private network to access the private network, the first 5G virtual network comprising the first user plane functions and at least one first interface interfacing the first user plane functions with the private network;
- receiving, from the first network function, a first indication that the at least one change in the first user plane functions has occurred; and
- sending, to a router manager of the private network, an update including information concerning a current architecture of the 5G virtual network for causing the router manager of the private network to update at least one virtual private network tunnel of the at least one first interface from the private network to the public network.

13. The method as claimed in claim 12, the method further comprising:
- signalling, to a second network function, a second request to be notified of at least one change in second user plane functions associated with a second 5G virtual network comprising another public network and another private network, the another public network for use by user equipment of the another private network to access the another private network, the second 5G virtual network comprising the second user plane functions and at least one second interface interfacing the second user plane functions with a second data network;
- receiving, from the second network function, a second indication that the at least one change in the second user plane functions has occurred; and
- sending, to a router manager of the another private network, an update including information concerning a current architecture of the second 5G virtual network for causing the router manager of the another private network to update at least one virtual private network tunnel of the at least one second interface from the another private network to the another public network.

14. The method as claimed in claim 12, wherein the first network function is comprised in the first 5G virtual network.

15. The method as claimed in claim 12, wherein the at least one change comprises at least one of the following:
- an addition of a new interface to the first 5G virtual network; or
- a removal of a first interface of the at least one first interface from the first 5G virtual network.

16. The method as claimed in claim 12, wherein the first network function is at least one of the following:
- a network exposure function; or
- a session management function.

17. The method as claimed in claim 12, wherein the first request comprises an identifier of a virtual network group that identifies the first 5G virtual network.

18. The method as claimed in claim 12, wherein the first indication comprises at least one of the following:
- a first identifier of the first 5G virtual network;
- at least one of the following: a second identifier or addressing information identifying at least one interface to the first 5G virtual network; or
- an indication of whether the at least one interface to the first 5G virtual network identified by the at least one of the second identifier or the addressing information has been at least one of the following: removed or added to the first virtual network.

19. The method as claimed in claim 18, wherein the second identifier comprises at least one of: an Internet Protocol address, a media access control address, a Multi-protocol Label Switching label and/or a Segment routing Multiprotocol Label Switching label.

20. A non-transitory computer-readable medium storing instructions which, when executed by an apparatus, causes the apparatus to perform:
- signalling, to a second network function, a second request to be notified of at least one change in second user plane functions associated with a second 5G virtual network comprising another public network and another private network, the another public network for use by user equipment of the another private network to access the another private network, the second 5G virtual network comprising the second user plane functions and at least one second interface interfacing the second user plane functions with a second data network;
- receiving, from the second network function, a second indication that the at least one change in the second user plane functions has occurred; and
- sending, to a router manager of the another private network, an update including information concerning a current architecture of the second 5G virtual network for causing the router manager of the another private network to update at least one virtual private network tunnel of the at least one second interface from the another private network to the another public network.

* * * * *